Patented Oct. 14, 1930

1,778,199

UNITED STATES PATENT OFFICE

JOHN NEUMANN, OF CHICAGO, ILLINOIS

MANUFACTURE OF PULP

No Drawing. Application filed June 14, 1926, Serial No. 116,020. Renewed January 4, 1930.

The present inventor has discovered an improved process by which wood and various fibrous vegetable products may be made into pulp or treated for recovery of cellulose.

For illustration, reference will be made to the manufacture of wood pulp by a process embodying the invention. According to this process, the raw material is subjected to the action of a solution which will attack the resinous constituent of the wood and in which a reagent is introduced with the effect of digesting matter encrusting the cellulose fibres and opening up the fibres, leaving the cellulosic basis of the wood in condition to be worked into pulp.

The chemicals employed by the inventor are silicate of sodium and sodium sulphide, and in some instances additional ingredients. He has employed silicate of sodium and sodium sulphide in an amount by weight equal to 5% of the weight of the wood to be treated, and in the proportion of four parts of silicate of sodium to one part of sodium sulphide; with an amount of water for solution which by weight is two and one half times the weight of the wood, or in other words about one gallon of water for three pounds of wood to be treated. For instance in the manufacture of wood pulp from a ton batch or 2000 pounds of wood, the inventor would ordinarily employ about 666 gallons of water, 80 pounds of silicate of sodium and 20 pounds of sodium sulphide.

The wood, having been reduced to small chips or pieces, or in the form of excelsior or the like, is put in any suitable tank or vessel with the solution of silicate of sodium. The amount of water employed by the inventor is sufficient to cover the batch of wood chips or to form a sludge of the mass of wood chips and water. After a sufficient time has elapsed for the action of the solution on the wood, say one hour or longer, the sodium sulphide is introduced in the solution, the mass being thoroughly stirred to mix the sodium sulphide in the solution. Thereafter the wood remains in the solution for a further period sufficient to complete the process of digestion. The liquid with the dissolved constituents of the wood may then be drawn off from the tank, and the remaining cellulose is washed with water in the tank or removed and washed in an ordinary beater or hollander machine and then beaten in an ordinary beater for production of pulp for paper making.

While the wood should remain in the solution of silicate of sodium for a sufficient period for action of the solution, there is no objection to prolongation of this period. For instance, a large quantity of wood chips may be kept in storage in a solution of silicate of sodium, and desired amounts of the sludge of chips and solution may be drawn off as occasion requires for the ensuing step of treatment in the solution with the addition of the sodium sulphide.

In reducing certain materials, particularly jute, eucalyptus or materials containing a large percentage of resins and oils, it is desirable to add a portion of caustic potash or trichlorethylene or both. For example, in making pulp from jute, for a ton batch of jute pieces, the inventor would ordinarily add about five pounds of caustic potash and two or three pounds of trichlorethylene; these ingredients being introduced into the solution after the addition of the sodium sulphide.

The foregoing describes a cold method, usually requiring twelve hours or longer after the introduction of the sodium sulphide. Of course such a method is unique as compared with the prolonged and severe cooking with alkaline or acidulous liquors in the ordinary processes of making wood pulp.

On the other hand, the process of digestion may be expedited by heating or boiling, with equally unique results as to speed. For example, the process may be conducted in a retort by boiling the solution of silicate of sodium containing the mass of wood chips for about ten minutes and then adding the sodium sulphide, with the other mentioned ingredients when required, and continuing the boiling for from one to two hours under a pressure of from three to five pounds. This process, which is much quicker than the so-called quick cooks of prior commercial processes, is aided by preliminary soaking of the wood in the solution of silicate of sodium or in water; but even if the wood has not been so preliminarily treated the process may ordinarily be concluded in about two hours. Aside from the high speed of this process, the pressure employed is practically insignificant in comparison with even the so-called low pressures employed in prior commercial cooking methods. The relatively low pressure of from three to five pounds is employed principally to conserve the digesting fluid or in other words to prevent evaporation by the boiling process and thus avoid the necessity of adding more of the chemicals.

Both the cold method and the quick boiling method above described are much simpler and less severe than the ordinary commercial cooking methods; and in either case there is substantially less loss of material in the digesting process, or in other words there is a substantially greater recovery of cellulose or useful cellulosic matter. It is assumed that this may be due to the fact that while the treatment dissolves the resins and fats, it does not pass off the lignin or all the lignin into solution; or in other words that the cellulose is recovered with lignin or some of the ligning which may be usable therewith for making paper pulp and perhaps for other uses in the cellulose industry. However, the nature of lignin is not thoroughly understood as to whether it is strictly non-cellulose; and it may be that the recovery of the greater amount of cellulosic matter by the methods described is due to the fact that these methods recover many delicate cellulose fibres which under prior commercial methods would be destroyed or passed off with the cooking liquor. In any event the shrinkage of the wood treated with this process is much less than the shrinkage incident to ordinary commercial cooking processes, being as low as twenty per cent (20%) in some instances.

Among the materials that may be successfully treated are jute and bamboo as well as the various woods from which pulp is now made. All straws including wheat, rye, peas, beans, cotton stalks, corn stalks and sugar cane may be used as raw material, as well as raffia, esparto, etc. Paper pulp may be successfully obtained by these methods from such material as banana stalks, wooden twigs, knots, centers of wood, waste such as screening, and rotten wood can also be used as the raw material for production of pulp for certain classes of paper.

The fibre obtained by these methods is strong and easily bleached.

The silicate of sodium represents an ingredient which in the solution has a solvent action upon resins and furnishes an appropriate agent for reaction with the sodium sulphide, the latter representing an agent having a solvent action on oils or fats.

What I claim is:
1. A process of obtaining cellulose characterized by subjecting cellulosic raw material to the action of a silicate of sodium and sodium sulphide in solution.
2. A process of obtaining cellulose characterized by subjecting cellulosic raw material to the action of a solution of silicate of sodium and introducing sodium sulphide in the solution.
3. A process of obtaining cellulose characterized by soaking cellulosic raw material in a solution of a chemical with which sodium sulphide reacts; introducing sodium sulphide into the solution; and maintaining the raw material in the solution having the sodium sulphide added until the digesting of the material leaves the cellulose or usable cellulosic matter.
4. A process of obtaining cellulose characterized by soaking cellulosic raw material in a solution of a chemical with which sodium sulphide reacts; introducing ingredients including sodium sulphide in the solution; and maintaining the raw material in the solution having the added ingredients until the process of digestion leaves cellulose or usable cellulosic material.
5. A process of obtaining cellulose characterized by boiling cellulosic raw material in a solution having a solvent action on resinous matter, adding sodium sulphide, and continuing the boiling until the material is reduced to cellulose or useful cellulosic matter.
6. A process of obtaining cellulose characterized by subjecting cellulosic raw material to action of silicate of sodium and sodium sulphide in a boiling solution.
7. A process of obtaining cellulose characterized by digesting cellulosic raw material in a boiling solution of alkaline ingredients including silicate of sodium.

In testimony whereof, I have signed my name to this specification.

JOHN NEUMANN.